United States Patent [19]

Gatt

[11] 3,754,623
[45] Aug. 28, 1973

[54] TRAILER BACK-UP BRAKE RELEASE FOR SURGE OPERATED BRAKES

[75] Inventor: Michael Earl Gatt, South Bend, Ind.
[73] Assignee: The Bendix Corporation, South Bend, Ind.
[22] Filed: Feb. 24, 1972
[21] Appl. No.: 228,936

[52] U.S. Cl. ............................................. 188/112
[51] Int. Cl. ............................................. B60t 7/20
[58] Field of Search ..................... 188/112; 180/103

[56] References Cited
UNITED STATES PATENTS
2,921,652  1/1960  Smith ............................... 188/112
2,969,857  1/1961  Parkhurst ......................... 188/112
3,285,373  11/1966  Wilson ............................. 188/112

Primary Examiner—Duane A. Reger
Attorney—Ken C. Decker et al.

[57] ABSTRACT

A surge brake actuator which includes two relatively movable members, one connected to a towing vehicle and the other connected to a trailer, is held in an extended position by spring means which is collapsible upon relative movement between the vehicle and trailer. Trailer brake applying means, including a hydraulic brake master cylinder, is operatively connected to one of said members to respond to relative movment between said members for applying the trailer brakes. A mechanism responsive to a backing maneuver of the vehicle and trailer is operatively connected to said brake applying means for rendering said brake applying means ineffective to apply said trailer brakes.

1 Claim, 4 Drawing Figures

Patented Aug. 28, 1973

TRAILER BACK-UP BRAKE RELEASE FOR SURGE OPERATED BRAKES

BACKGROUND OF THE INVENTION

This invention relates to surge brake actuators for applying the brakes of a trailer when it tends to overrun or push the vehicle towing it.

It is an accepted fact that house trailers, recreational trailers, and small cargo carrying trailers which are drawn by automobiles present a control problem when braking even under the best of conditions. This problem is compounded as the speed of the vehicle and the weight of the trailer increases. Various types of braking systems have been employed on trailers, including pneumatic, electric, and surge braking. Of these systems, pneumatic and electric brake actuation of the trailer is often done by the vehicle driver separately and independently of the vehicle braking and unless the driver is skilled it can be extremely hazardous in heavy traffic and on curves, especially if braking between the vehicle and trailer is not coordinated.

It is the surge brake actuator with which we are presently concerned. This actuator is incorporated into the coupling connection or hitch between a towing vehicle and a trailer to apply the trailer brakes automatically if the trailer tends to overrun or push the vehicle. In spite of the popularity of the surge brake actuator and its wide acceptance on trailers towed by automobiles, the surge actuator has one significant disadvantage. That disadvantage is the inexpedient application of the brakes on the trailer during a backing maneuver resulting from the trailer tending to overrun the automobile to which it is hitched. Braking the trailer during a backing maneuver is, of course, very undesirable since it interferes with guiding and maneuvering the trailer. This trailer backing problem could be resolved if the trailer wheels were free to roll. It is to be noted that a less effective brake must be installed on trailers using present day surge actuators in order to back the trailer with a minimum of resistance to back-ing. Using a less effective brake on the trailer is not the answer since that approach only magnifies the hazards of trailer braking. Actually a more effective brake is required for trailer use on present day highways.

Reference is made to U.S. Pat. Nos. 3,342,292, 3,077,248 and 2,625,243 as showing surge brake actuators representing the present state of the art.

This invention is proposed as a solution to certain of the braking problems confronting the trailer industry.

SUMMARY OF THE INVENTION

A principal object of the invention is the provision of an improved surge brake actuator adapted to be located in the hitch connection between a towing vehicle and a trailer for withholding application of the trailer brakes when the vehicle and trailer are being backed.

Another object of the invention is the provision of a surge brake actuator incorporated in the hitch between a towing vehicle and a trailer for automatically applying the trailer brakes when the trailer tends to overrun the vehicle while moving forward but ineffective in applying the trailer brakes when the trailer and vehicle are being backed.

A still further object of the invention resides in the provision of a surge brake actuator having two resiliently opposed relatively movable members connected respectively to a towing vehicle and to a trailer and having trailer brake applying means including a force transmitting linkage and a master cylinder operative upon relative movement between said members for applying said trailer brakes, and wherein the brake applying means is rendered impotent by a mechanism responsive to the towing vehicle being backed.

Still another object of the invention is to provide a spring loaded surge brake actuator for connecting a towing vehicle to a trailer which includes trailer brake applying means operative upon collapse of the spring loaded actuator when the trailer tends to overrun the vehicle, and wherein a mechanism responsive to a backing maneuver of the towing vehicle is mechanically connected with said brake applying means to forestall the collapse of said actuator so that the trailer brakes are not applied.

A more specific object of the invention is to provide a surge brake actuator having two resiliently opposed relatively movable members connected respectively to a towing vehicle and to a trailer and having trailer brake applying means including a force transmitting linkage and a master cylinder operative upon relative movement between said members for applying said trailer brakes, and wherein valve means responsive to the towing vehicle being backed is operatively connected to the outlet of the master cylinder so that said brake applying means is ineffective to apply the trailer brakes.

DETAILED DESCRIPTION

Figures 1, 2:
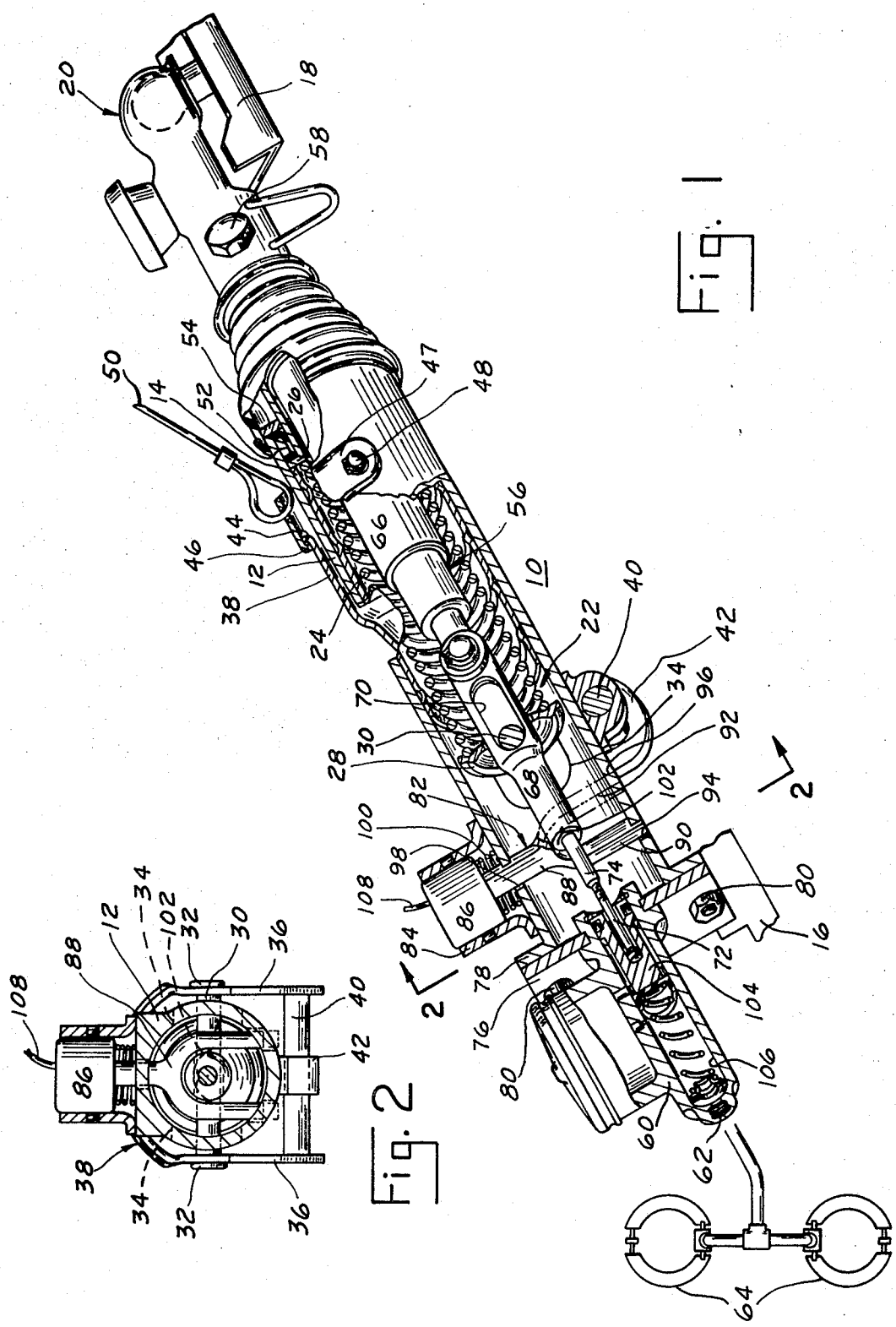
FIG. 1 is a view in perspective of the preferred embodiment of the invention shown associated with one type of surge brake actuator.
FIG. 2 is a view in cross section taken along the line 2—2 of FIG. 1.

Referring now to FIG. 1 of the drawing, there is shown a trailer brake actuator 10 having two relatively movable members 12 and 14 which are adapted to be secured respectively to a trailer and a towing vehicle. The member 12 is mounted to the trailer structure 16 and the member 14 is pivotally connected to the towing vehicle structure 18 through a hitch 20 of standard construction, commonly termed a ball and socket joint. The members 12 and 14 are of tubular construction and are coaxially arranged one within the other. They are yieldably and collapsibly retained in an extended position by spring means 22 including a coil spring 24 preloaded or caged between the members 12 and 14. One end of the coil spring 24 abuts a radially inwardly extending flange 26 formed at the upper end of the member 14. The other end of the spring 24 engages a retainer element 28 mounted to a transverse pin 30 having outer ends 32 which pass through longitudinally extending slots 34 in the diametrical sides of the tubular member 12, as best shown in FIG. 2. The ends 32 of the pin 30 are carried in arms 36 of a lever 38. The lever 38 is pivoted at 40 in a bracket 42 attached to the bottom side of the member 12. The top end of the lever 38 is formed with an upwardly projecting flared end portion or lip 46 formed in lever 47 which is pivotally mounted by pins 48 to the member 12 so as to lockingly retain the lever 38 in the position shown in FIG. 1. A cable 50 has one end secured to the top side of the lever 47 and its other end connected to the towing vehicle for a purpose fully explained in copending U. S. application Ser. No. 47,069, now U.S. Pat. No. 3,647,032, filed June 17, 1970 and assigned to the common assignee of the present invention. In the latched position of the levers 38 and 47, as shown in FIG. 1, the spring 24 holds the members 12 and 14 in extended position so that resilient spacer 52 is compressed between the flange 26 of the member 14 and a radially inwardly extending flange 54 at the outer end of the member 12. These flanges or abutments 26 and 54 restrict the extended position of the two members 12 and 14.

Trailer brake applying means 56 is operatively connected to the tubular member 14 by a stud or bolt 58 located transversely of the member 14 and to a conventional automotive master cylinder 60 having an outlet port 62 in communication with trailer brakes 64. The brake applying means includes a force transmitting linkage having a conventional shock absorber 66, a rod member 68 having a slot 70 therein through which the pin 30 passes, and a master cylinder push rod 72 which threadedly engages small diameter portion 74 of the member 68. The master cylinder 60 is mounted to an end plate 76 which is fastened to a flange portion 78 of the tubular member 12 by bolts 80. Details of the construction and operation of the surge brake control are more completely described in copending U. S. application Ser. No. 47,069, filed June 17, 1970, owned by the common assignee of the present invention and incororated herein by reference.

A mechanism 82, operative upon a backing maneuver of the towing vehicle and trailer for rendering said brake applying means ineffective to apply the trailer brakes, is mounted on the tubular member 12 by a bracket 84. The mechanism 82 includes an electrically operated solenoid device 86 having a bifurcated armature 88 with depending legs 90 and 92 for straddling the rod member 68 of the force transmitting linkage. The legs 90 and 92 are guided in openings 94 and 96 respectively in the bottom wall of the tubular member 12. The upper end of the armature 88 passes through an opening 98 of the member 12. When the solenoid device 86 is de-energized, which is the position shown in FIG. 1, a spring 100 urges the armature upwardly so that the rod member 68 will slide to the left between the legs 90 and 92. Upon energization of the device 86, the armature 88 shifts downwardly into engagement with and overlying the small diameter portion 74 to thereby provide locking means for the brake applying means 56. In the energized position of the armature, an abutment 102 formed at the junction between the small diameter portion 74 and the rod member 68 is in locking engagement with the armature 88, preventing the force transmitting linkage from driving master cylinder piston 104 into bore 106 to apply the trailer brakes 64. A wire 108 of the device 86 is adapted to be connected to the towing vehicle's electrical circuit which includes its backup lights so that any backing maneuver of the vehicle and trailer immediately actuates the mechanism 82 causing the armature 88 to shift into the path of movement of the abutment 102 to thereby render said trailer brake applying means ineffective. The locking position of the armature 88 on the abutment 102 is best shown in dotted lines in FIG. 2. It is to be observed that the wire 108 may alternatively be connected to the towing vehicle's electrical system in a manner to cause the armature 88 to respond to reverse gear selection on the vehicle, thus energizing said device 86 during a backing maneuver so that the trailer brakes are unapplied.

Figure 3:
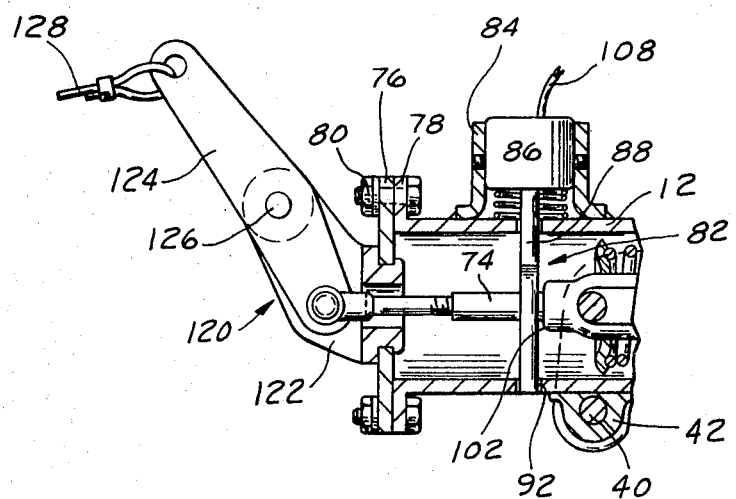
FIG. 3 is a fragmentary sectional portion of the left end only of FIG. 1, showing a modified form of the surge brake actuator.

In FIG. 3 the hydraulic master cylinder has been eliminated and the brake applying means is drivably connected to lever means 120 having a bracket 122 supported in the end plate 76 of the tubular member 12. A lever arm 124 is rotatably mounted to the bracket 122 by a pin 126 secured to the upper end portion of the bracket. The arm 124 is adapted to be connected to mechanical type trailer brakes, as distinguished from hydraulic brakes, through a cable 128. Substituting the lever means 120 for the master cylinder 60 permits using the surge brake actuator of FIG. 1 with mechanical trailer brakes.

MODE OF OPERATION

In a situation when both the towing vehicle and the trailer are moving forwardly at a fairly constant speed along the highway, the relative positions of the component parts of the surge brake actuator will be as shown in FIG. 1. At this time the members 12 and 14 are in their extended positions. Should the towing vehicle's operator apply the brakes on the towing vehicle, causing it to decelerate, initially the trailer will tend to continue moving at a constant speed, so that relative movement will occur between the members 12 and 14, collapsing the spring 24. Since the brake applying means 56 is connected to the member 14 at one end and to the member 12 at its other end, relative movement between these members causes the master cylinder piston 104 to move down the bore 106 to thereby develop pressure at the outlet port 62 to apply the trailer brakes 64 in a manner well known in the brake art. As soon as the vehicle and trailer are again moving forwardly at relatively constant speeds with respect to each other, the piston 104 will have been returned to the position shown in FIG. 1, thus releasing the trailer brakes and locating the members 12 and 14 in their extended position.

Should a backing maneuver of the towing vehicle and trailer be desired, the towing vehicle's reverse gear is selected which connects the backing light circuit of the vehicle with the solenoid 86 of the mechanism 82. This energizes the solenoid 86 causing the armature 88 to shift downwardly into the path of movement of the abutment 102, thereby locking the brake applying means 56 including the force transmitting linkage against displacing the master cylinder piston 104 of FIG. 1 or rotating the lever 124 in FIG. 3 when the vehicle is backed. In each of the situations of FIGS. 1 and 3, the trailer brake applying means is rendered ineffective to apply the trailer brakes when backing.

DESCRIPTION OF ALTERNATE EMBODIMENT

Those parts in the alternate embodiment which are the same as those in the preferred embodiment will use the same reference numeral. In the alternate embodiment of FIG. 4, there is shown the master cylinder 60 of FIG. 1 operatively associated with a surge brake actuator which can be considered identical to that of FIG. 1, except that the mechanism 82 is omitted. Such a surge actuator, omitting the mechanism 82, is shown in U. S. application Ser. No. 47,069, filed June 17, 1970 and incorporated herein by reference.

Figure 4:
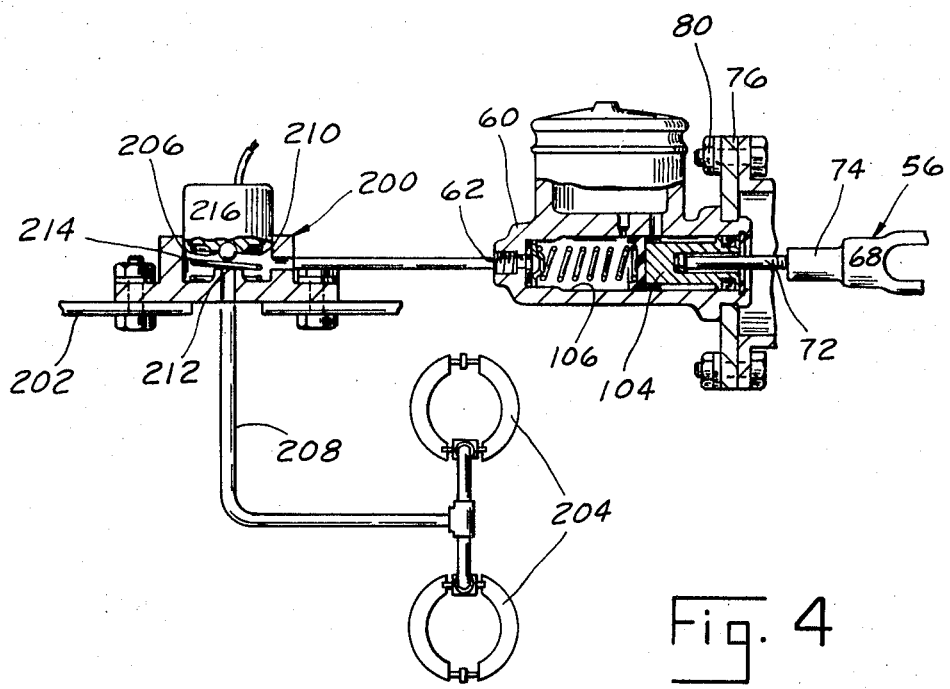
FIG. 4 is a partial sectional view showing diagrammatically a modified form of the invention.

With reference to FIG. 4, a mechanism 200 secured to trailer structure 202 is associated with brake applying means 56 in such a manner as to render said brake applying means ineffective to apply the trailer brakes 204 during a backing maneuver. The mechanism 200 is located at the outlet 62 of the master cylinder and includes valve means 206 positioned in hydraulic line 208 connecting the outlet port 62 with the trailer brakes 204. The valve means 206 is provided with a valve member 210 normally urged off its seat 212 by a spring 214. The valve member 210 is slidably carried in solenoid device 216 for engagement with the seat 212 upon energization of the device by connecting it to the backup light circuit of the towing vehicle or alternatively adapting the device to be energized upon selection of reverse gear in the towing vehicle.

During forward movement of the vehicle and trailer the surge actuator functions the same as in FIG. 1. However, during a backing maneuver of the vehicle and trailer the solenoid 216 of the mechanism 200 is energized due to reverse gear selection of the towing vehicle. This forces the valve member 210 onto the seat 212 interrupting the flow of fluid from the outlet port 62 to the brakes 204. This action of the valve member 210 functions to render the brake applying means ineffective to operate the trailer brakes.

I claim:
1. In a trailer brake actuator:
a pair of relatively movable members, one of said members being adapted to be connected to a towing vehicle and the other of said members being adapted to be connected to a trailer having brakes;
trailer brake-applying means carried by the other member;
linkage means interconnecting said one member with the trailer brake-applying means and responsive to relative movement between said members to move in a brake-applying direction to actuate said trailer brake-applying means to thereby actuate the trailer brakes;
said other member having a tubular section, said linkage means extending into said tubular section and having a transversely extending abutment surface within said tubular section; and
locking means carried on said tubular section, said locking means including a plunger having a bifurcated end presenting a pair of legs, said legs straddling said linkage means, said tubular section having a pair of openings receiving said legs and a third opening opposite said pair of openings receiving the opposite end of said plunger, and electrically actuated means adapted to be connected to the vehicle back-up light circuit and being actuatable to shift said plunger from a first position permitting said linkage means to move relative to the tubular section to a second position in which the plunger cooperates with the abutment surface to inhibit movement of the linkage means, thereby inhibiting operation of the trailer brake-applying means to prevent actuation of the trailer brakes.

* * * * *